(12) United States Patent
Sasano et al.

(10) Patent No.: US 6,953,080 B2
(45) Date of Patent: Oct. 11, 2005

(54) FRONT END STRUCTURE OF VEHICLE PREVENTING SHORT-CIRCUIT OF COOLING AIR

(75) Inventors: Norihisa Sasano, Ama-gun (JP); Akira Uchikawa, Nagoya (JP); Satoshi Matsuura, Takahama (JP); Kouichi Mizukami, Okazaki (JP)

(73) Assignee: Denso Corporation, Kariya (JP)

( * ) Notice: Subject to any disclaimer, the term of this patent is extended or adjusted under 35 U.S.C. 154(b) by 124 days.

(21) Appl. No.: 10/245,182

(22) Filed: Sep. 16, 2002

(65) Prior Publication Data

US 2003/0051858 A1 Mar. 20, 2003

(30) Foreign Application Priority Data

Sep. 17, 2001 (JP) ........................................ 2001-281935

(51) Int. Cl.⁷ .............................. B60K 11/04; F28F 7/00
(52) U.S. Cl. ......................... 165/41; 165/76; 180/68.4
(58) Field of Search .............................. 165/41, 42, 43, 165/44, 76; 180/68.4, 68.6

(56) References Cited

U.S. PATENT DOCUMENTS

| 5,341,652 A | * | 8/1994 | Tajiri et al. .................... 165/42 |
| 5,358,304 A | * | 10/1994 | Kanemitsu et al. ........ 180/68.4 |
| 6,516,906 B2 | * | 2/2003 | Sasano et al. ............. 180/68.4 |

FOREIGN PATENT DOCUMENTS

JP         6-84225        12/1994

* cited by examiner

*Primary Examiner*—Ljiljana Ciric
(74) *Attorney, Agent, or Firm*—Harness, Dickey & Pierce, PLC

(57) ABSTRACT

A first pipe 231 and a second pipe 232 are connected using connectors 233 and 234 so that at least one of the connectors 233 and 234 is located in a through-hole 133. In this way, since the through-hole 133 is filled in by at least one of the connectors 233 and 234, the gap between the connectors 233 and 234 and the edge of the through-hole 133 can be considerably reduced. It is, therefore, possible to prevent hot air from moving to the front of a panel 100 through the gap between connectors 233 and 234 and the edge of the through-hole 133.

3 Claims, 7 Drawing Sheets

FRONT END STRUCTURE OF VEHICLE PREVENTING SHORT-CIRCUIT OF COOLING AIR

BACKGROUND OF THE INVENTION

1. Field of the Invention

The present invention relates to a structure for mounting a front end panel that extends in the direction of a vehicle's width at the front end of the vehicle, heat exchangers such as a condenser, which are mounted on the front side of the vehicle in front of the front end panel, and external pipes that connect the heat exchangers and air conditioning devices such as a compressor and an expansion valve, which are mounted on the vehicle behind the front end panel.

2. Description of the Related Art

Generally, heat exchangers such as a condenser and a radiator are attached to strong members such as a front end panel (abbreviated to a panel hereinafter) provided at the front end of a vehicle, but the temperature of a refrigerant that flows through a condenser is lower than that of a cooling water that flows through a radiator, therefore, the condenser 200 is mounted on the front side of the vehicle (upstream side of air flow) in front of the radiator (panel), as shown in FIG. 6.

On the other side, air conditioning devices such as a compressor and an expansion valve are mounted on the vehicle behind the panel (downstream side of air flow), therefore, refrigerant pipes (external pipes) 230 to be connected to the condenser are arranged through the panel, as shown in FIG. 6 and FIG. 7. The holes, which are provided in the panel and through which the refrigerant pipes penetrate, are called through-holes 133 hereinafter.

Since connectors (connecting blocks) 233 and 234 that have external dimensions larger than the outer diameters of the refrigerant pipes are connected to the ends of the refrigerant pipes 230 in order to facilitate connection of the refrigerant pipes 230, the sizes of the through-holes 133 need to be large enough for the connectors 233 and 234 to penetrate through, that is, larger than the outer diameters of the refrigerant pipes 230.

Because of this, as shown in FIG. 7, a comparably large gap is formed between the refrigerant pipe 230 and the through-hole 133 (its edge) in a state in which the refrigerant pipe 230 is connected to the air conditioning devices such as a compressor and an expansion valve, therefore, a problem may occur in that hot air heated by devices such as an engine mounted on the vehicle behind the panel moves to the condenser side (the front side of the vehicle in front of the panel) through the gap, resulting in degradation of the cooling ability of the condenser and the radiator.

One of the countermeasures against this problem is to fill the gaps with filling means such as rubber (a grommet) and packing, but this countermeasure will cause the number of the parts that constitute the front end structure and the man-hours required in assembling the front end structure to increase, resulting in rise in the manufacturing costs of the vehicle.

SUMMARY OF THE INVENTION

The above-mentioned problem being taken into account, the objective of the present invention is to suppress a rise in the manufacturing costs of the vehicle and prevent hot air from moving to the front side of the vehicle, in front of the panel, through the gaps between the pipes and the through-holes (its edge).

In order to achieve the above-mentioned object, the first aspect of the present invention relates to a front end structure of a vehicle, which comprises a front end panel (100) that extends in the direction of a vehicle's width at the front end of the vehicle, heat exchangers (200) mounted on the front side of the vehicle in front of the front end panel (100), and external pipes (230) that connect the heat exchangers and devices mounted on the vehicle behind the front end panel (100); wherein the external pipes (230) are arranged in such a way as to penetrate through the front end panel (100); wherein each of the external pipes (230) is composed of a first pipe (231), one end of which is connected to the heat exchanger (200) and to the other end of which a first connector (233) for connection is connected, and a second pipe (232), to one end of which a second connector (234) connected to the first connector (233) is connected and the other end of which is connected to the devices; wherein through-holes (133), into which at least one of the connectors (233, 234) can be inserted, are provided in the front end panel (100); and wherein at least one of the connectors (233, 234) is located in each of the through-holes (133) in a state in which both the connectors (233, 234) are connected.

Since each of the through-holes (133) is brought into a state in which each of the holes is filled in with the connector, as described above, the size of the gap between the external pipe (230) (including the connectors (233, 234)) and the through-hole (133) becomes considerably smaller than in the prior art.

In this way, it is possible to reduce the gap between the external pipe (230) and the through-hole (133) without the necessity of filling in the gap with a filling means such as rubber (a grommet) and packing and, therefore, while suppressing the rise in the manufacturing costs of the vehicle, it is possible to prevent the hot air from moving to the front side of the vehicle, in front of the front end panel (100), through the gap between the external pipe (230) and the through-hole (133).

In the second aspect of the present invention, fixing means (134, 135) to fix at least one of the connectors (233, 234) are provided in the front end panel (100).

In the third aspect of the present invention, covers (136) are provided in the front end panel (100) in such a way as to be separated from the opening surfaces of the through-holes (133) at a specified distance and cover the through-holes (133) when viewed in the longitudinal direction of the vehicle.

The reference numbers in the brackets, of each means described above, are examples that show the correspondence to the concrete means described in the later embodiments.

The present invention may be more fully understood from the description of the preferred embodiments of the invention set forth below, together with the accompanying drawings.

DESCRIPTION OF THE PREFERRED EMBODIMENTS (First Embodiment)

Figure 1:
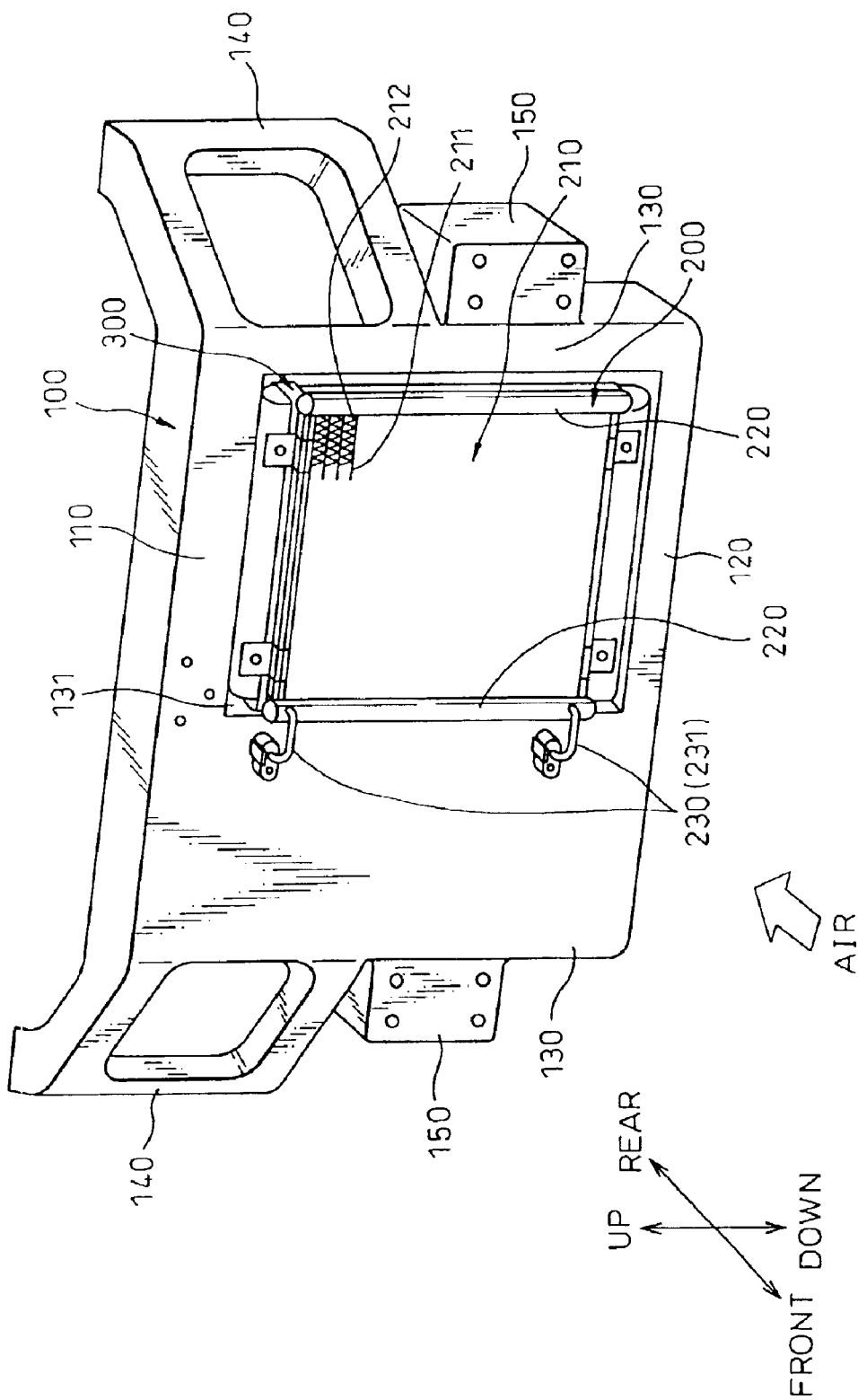
FIG. 1 is a perspective view that shows a front end structure (front end panel) in a first embodiment of the present invention.

In the present embodiment, the present invention is applied to a front end structure, that comprises a front end panel 100, to which vehicle front end parts are attached such as a radiator that cools the cooling water for an engine (internal combustion engine) to propel the vehicle, a condenser for the refrigerating cycle (air conditioning device) of the vehicle, and a blower unit that sends cooling air to the radiator and the condenser, and FIG. 1 is a perspective view of the front end structure (front end panel 100) in the present embodiment.

The condenser (200) is mounted on the front side of the vehicle (upstream side of air flow), and a blower unit (not shown schematically), an engine for propulsion (not shown schematically), and so forth, are mounted on the back side of the vehicle (downstream side of air flow), so that the condenser, and the devices such as blower unit, sandwich the front end panel 100 (abbreviated to panel 100 hereinafter). A radiator 300 is provided in a recess 132 formed in the panel 100, which will be described later.

The panel 100 extends at the vehicle front end in the direction of the vehicle's width, and the ends in the direction of the vehicle's width are attached to the vehicle body (side member) by the fastening means such as bolts, the radiator and the blower unit are attached to the panel 100 by the fastening means such as bolts, and the condenser 200 is attached to the radiator 300 by the fastening means such as bolts.

The condenser 200 is a well-known multi-flow type heat exchanger that comprises parts such as a condenser core 210 composed of plural tubes 211 through which a refrigerant flows, corrugated fins 212 that are arranged between the tubes 211 and increase the area of heat-transfer surface with air, and condenser tanks 220 that are arranged on both ends of the tubes 211 in the longitudinal direction of the condenser 200 and communicate with each condenser tube 211.

The radiator 300 has also a structure similar to the condenser 200 and, when mounted on the vehicle, the header tanks 220 of the condenser 200 are arranged so as to extend in the vertical direction of the vehicle and the tubes 211 are arranged so as to extend in the horizontal direction, while the header tanks of the radiator 300 are arranged so as to extend in the horizontal direction and the tubes are arranged so as to extend in the vertical direction, in the present embodiment.

The panel 100 comprises an upper beam 110 that is located at the upper side and extends in the horizontal direction, a lower beam 120 that is located at the lower side and extends in the horizontal direction, a wall-like panel 130 that extends in the vertical direction so as to connect both the beam members 110 and 120, light stays 140 to which headlights (not shown schematically) are attached, mounting portions 150 at which the panel 100 is attached to the vehicle body, and so forth, and these members 110 to 150 are formed integrally by using resin.

Figure 2:
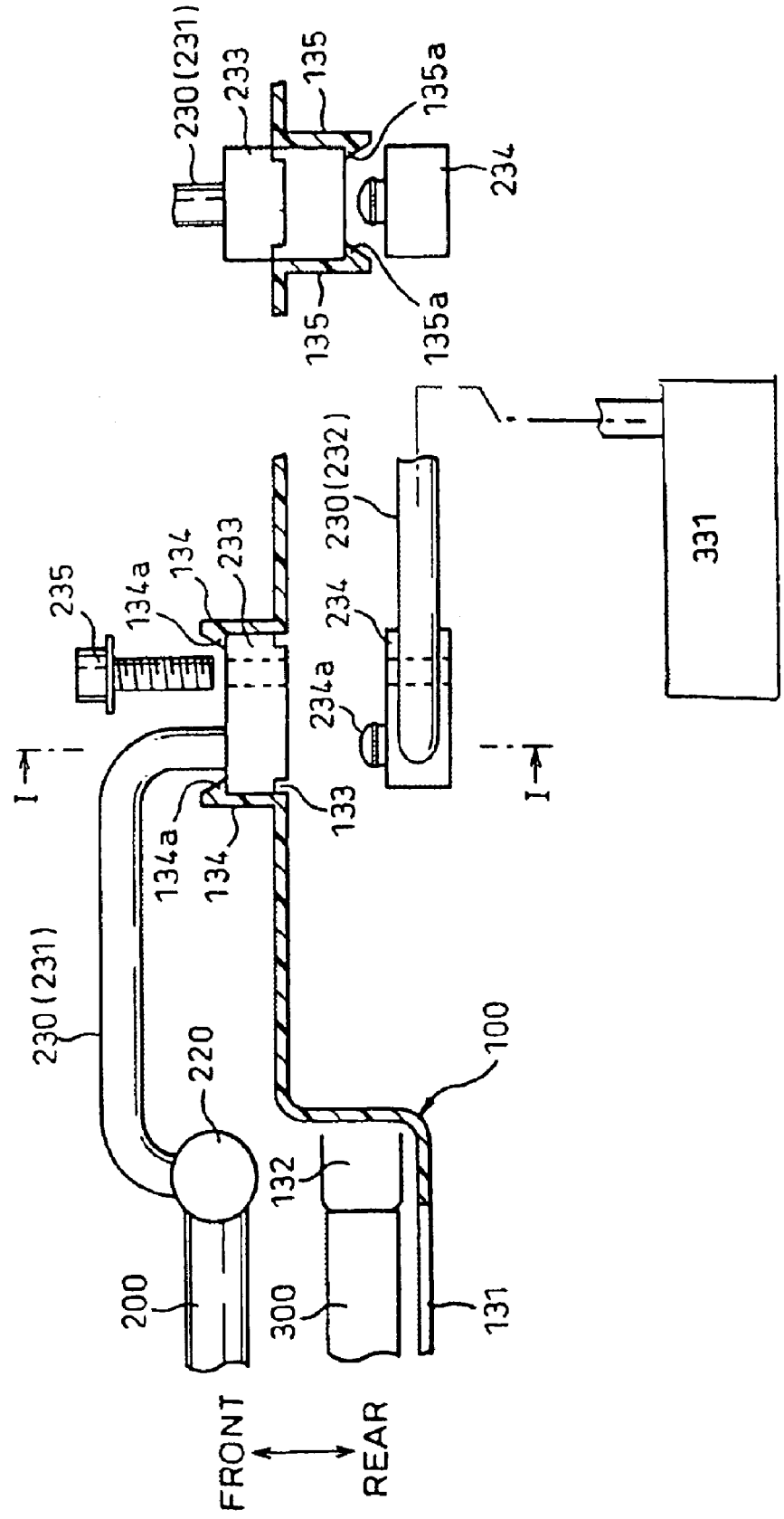
FIG. 2A is a sectional view that shows the front end structure (front end panel) in the first embodiment of the present invention.
FIG. 2B is a sectional view, taken along in line A—A shown in FIG. 2A.

The panel 130 is provided with a cooling air inlet (abbreviated to inlet hereinafter) 131 to send cooling air to the condenser 200 and the radiator 300, and the inlet 131 is open at the bottom of the recess 132 that protrudes to the back side of the vehicle so as to accommodate the radiator 300, as shown in FIG. 2.

Since the devices 331 (shown schematically) that constitute the air conditioning device (refrigerating cycle) such as a compressor and an expansion valve are mounted on the vehicle (engine side) behind the panel 100, the refrigerant pipes (external pipes) 230 that connect the condenser 200 and the air conditioning devices are arranged in (attached to) the vehicle in a state in which the pipes 230 penetrate the panel 100, as shown in FIGS. 1 and 2.

Each of the refrigerant pipes 230 is composed of a first pipe 231, one end of which is connected to the condenser 200 (its header tank 220) and to the other end of which the female connector (first connector) 233 for connection is attached by soldering, and a second pipe 232, to one end of which the male connector (second connector) 234 to be connected to the female connector 233 is attached and the other end of which is connected to the air conditioning devices, as shown in FIG. 2.

The external dimensions of the connectors 233 and 234 are larger than the outer diameters of the pipes 231 and 232, and both the connectors 233 and 234 (both the pipes 231, 232) are connected by fastening both the connectors 233 and 234 by the bolts (fastening means) 235, in a state in which a pipe-like protrusion 234a formed on the male connector 234 is inserted into the hole formed in the female connector 233.

The leakage of the refrigerant through the part of conjunction of both the connectors 233 and 234 can be prevented by a sealing means such as an O-ring provided between the protrusion 234a and the hole to hermetically seal the part.

The panel 100 is provided with the through-holes 133 formed so that the sizes thereof are large enough that at least either one of the connectors 233 and 234 (female connector 233 in the present embodiment) can be inserted.

Then, the first and second pipes 231 and 232 are connected so that at least either one of the connectors 233 and 234 (female connector 233 in the present embodiment) is located in the through-hole 133, in a state in which both the connectors 233 and 234 are connected.

The phrase "at least either one of the connectors 233 and 234 is located in the through-hole 133" also includes the case where at least one connector is located in the through-hole 133 and also the case where the surfaces of conjunction of the connectors 233 and 234 are located therein.

Figure 3:
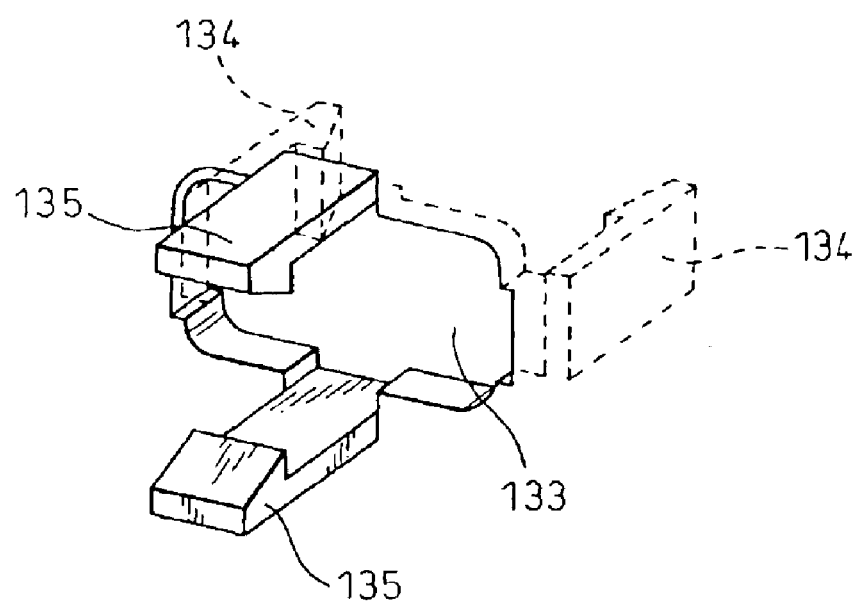
FIG. 3 is a perspective view of a through-hole in the front end structure (front end panel) in the first embodiment of the present invention.

The panel 130 is provided with engaging protrusions (engaging claws, fixing means) 134 that engage with and fix the female connector 233 and engaging protrusions (engaging claws, fixing means) 135 that engage with and fix the male connector 234, so that both protrusions 134, 135 are formed integrally, as shown in FIGS. 2 and 3, and hook-like claws 134a and 135a are provided on the top ends of the engaging claims (protrusions) 134 and 135 and the engaging claws 134 and 135 are designed so as to be able to be comparably easily bent, therefore, the connectors 233 and 234 can be mounted easily.

Next, the features (functions and effects) of the present embodiment are described below.

According to the present embodiment, as the first and second pipes 231 and 232 are connected so that at least either one of the connectors 233 and 234 is located in the through-hole 133, in a state in which both the connectors 233 and 234 are connected, the through-hole 133 is brought to a state of being filled in by the connector (female connector 233 in this case), and the gap between the refrigerant pipe 230 (connectors 233 and 234 are included) and the through-hole 133 (its edge) becomes considerably smaller than in the prior art, as shown in FIG. 2A.

In this way, it is possible to reduce the gap between the refrigerant pipe 230 (connectors 233 and 234 are included) and the through-hole 133 (its edge) without the necessity of filling in the gap with a filling means such as rubber (a grommet) and packing, therefore, while suppressing the rise in the manufacturing costs of the vehicle, it is possible to prevent the hot air from moving to the front side of the vehicle in front of the panel 100 through the gap between the refrigerant pipe 230 and the through-hole 133 (its edge). Moreover, it is possible to prevent in advance the cooling ability of the condenser 200 and the radiator 300 from degrading.

In addition, as the engaging claws 134 and 135 are provided, it is not necessary to support both the connectors 233 and 234 when connecting both the pipes 231 and 232, thus the work to connect both the pipes 231 and 232 is made easier.

(Second Embodiment)

Figure 4:
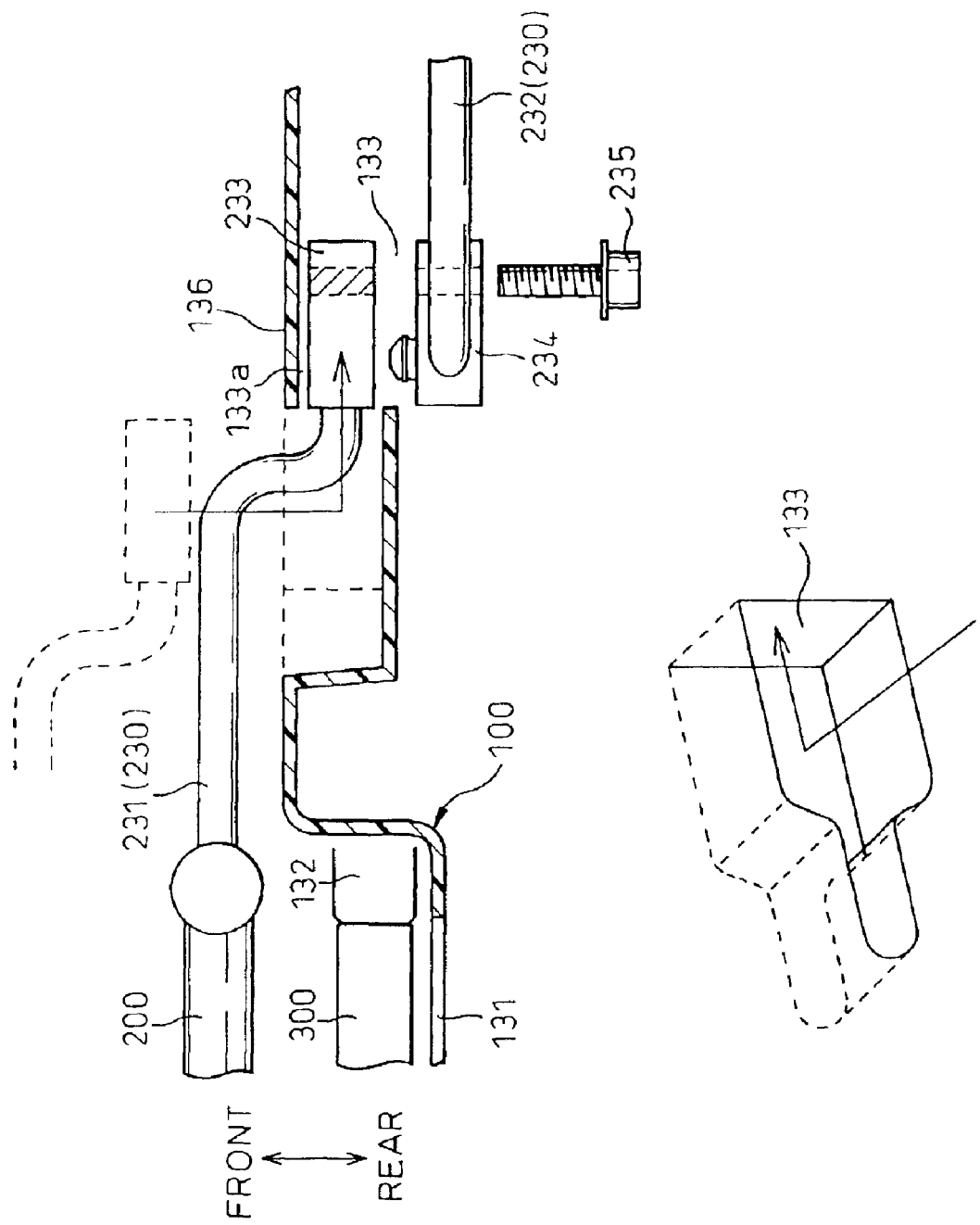
FIG. 4A is a sectional view that shows a front end structure (front end panel) in a second embodiment of the present invention.
FIG. 4B is a perspective view of a through-hole in the front end structure (front end panel) in the second embodiment of the present invention.

In the present embodiment, the panel 100 is provided with covers 136, which are formed integrally to the panel 100 so as to cover the through-holes 133 when viewed in the front side of the vehicle, and are separated from the opening surfaces of the through-holes 133 by a specified distance 133a (a distance that can accommodate the female connector 233, in the present embodiment), as shown in FIG. 4A.

Figure 5:
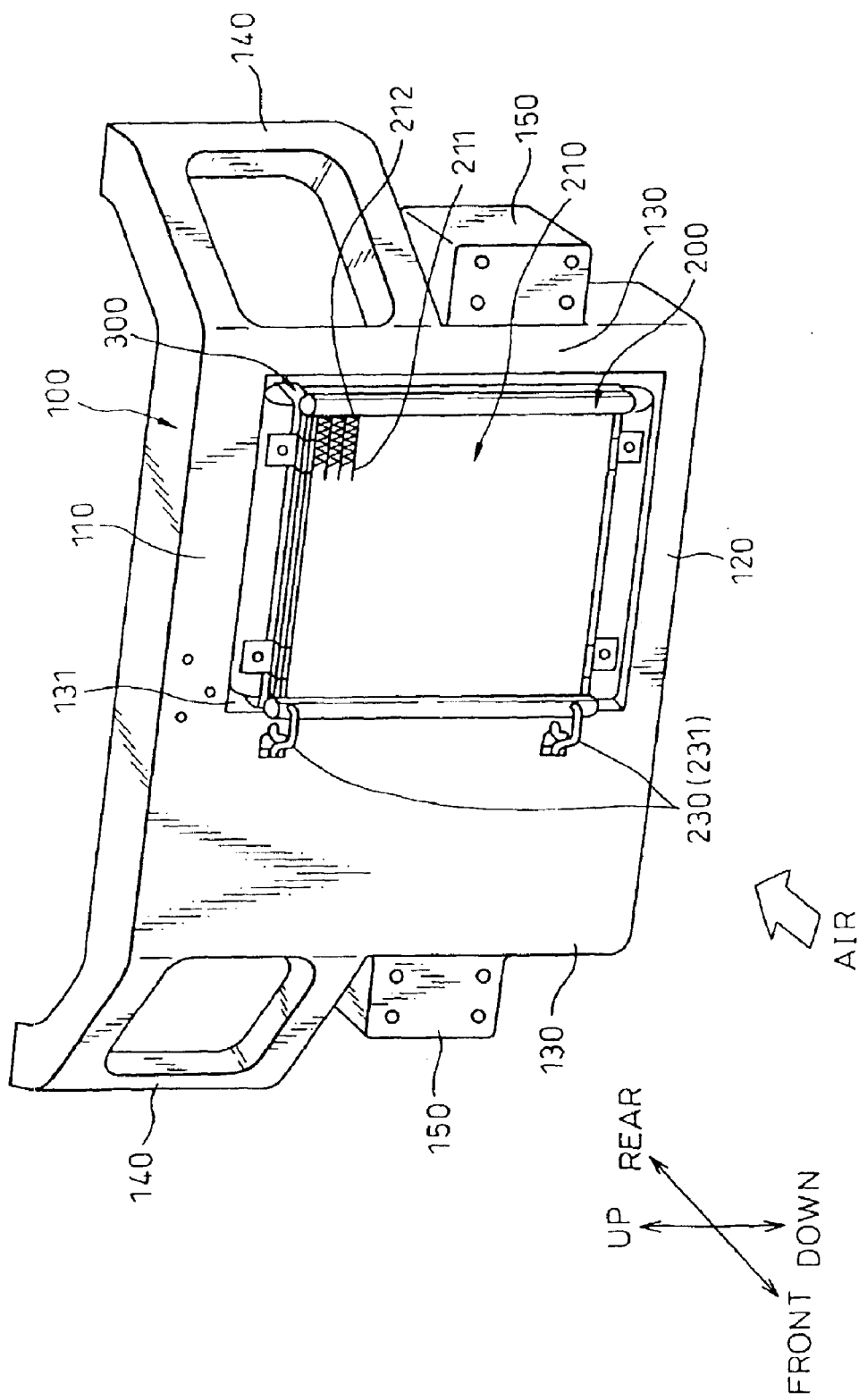
FIG. 5 is a perspective view that shows the front end structure (front end panel) in the second embodiment of the present invention.
Figure 6:
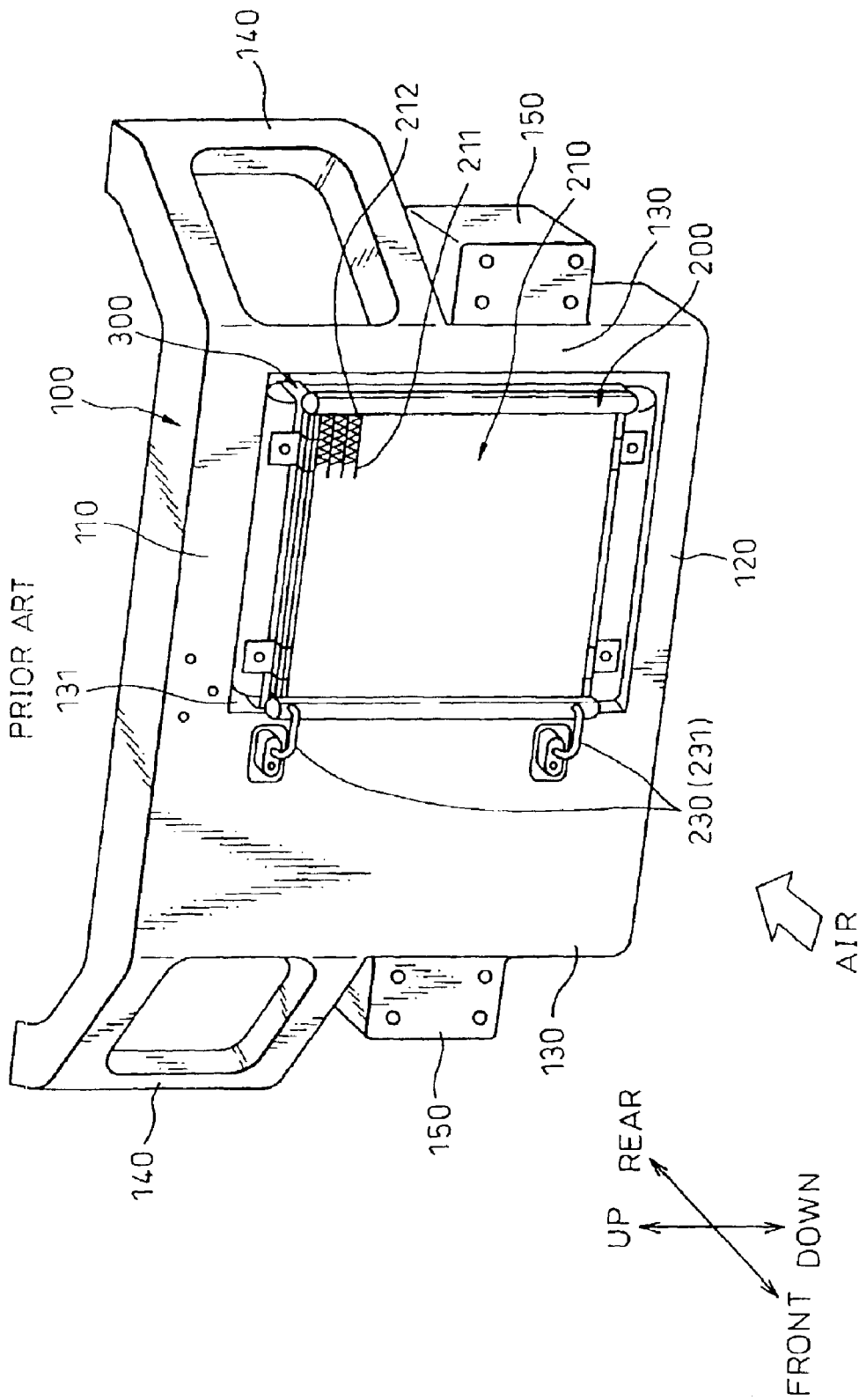
FIG. 6 is a perspective view that shows a front end structure (front end panel) to illustrate the problems to be solved by the present invention.
Figure 7:
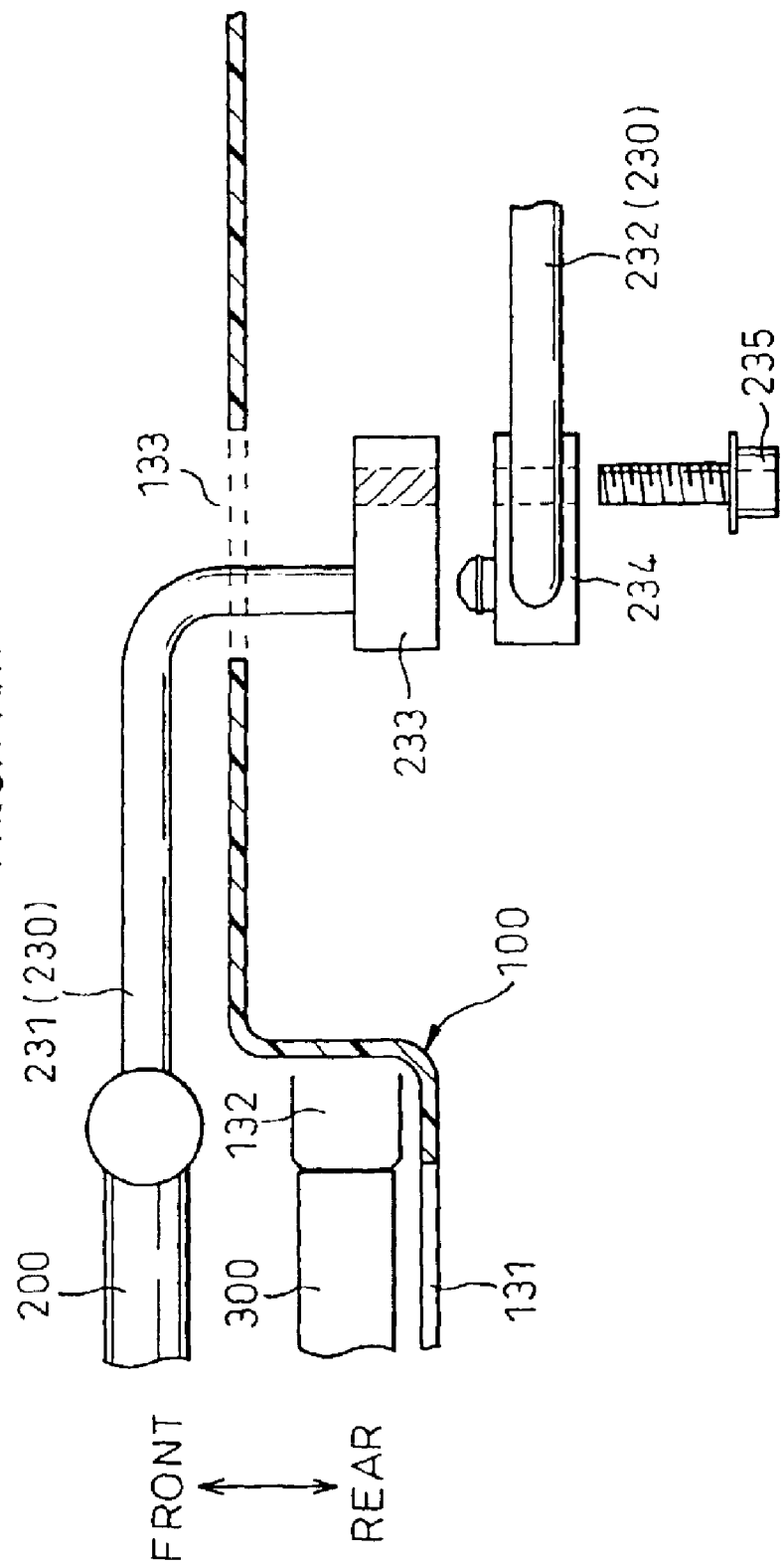
FIG. 7 is a sectional view that shows the front end structure (front end panel) to illustrate the problems to be solved by the present invention.

In this way, the through-hole 133 is brought into a state which has the same effect as being filled in, as shown in FIG. 5, therefore, it is possible to prevent, without fail, hot air from moving to the front side of the vehicle, and in front of the panel 100, through the gap between the refrigerant pipe 230 and the through-hole 133 (its edge).

In the present embodiment, the position of the surfaces of conjunction of the connectors 233 and 234 is shifted toward the back of the vehicle compared to the case of the first embodiment, and at the same time, when the first pipe 231 is connected to the second pipe 232 the second pipe 232 (male connector 234) and the first pipe 231 (female connector 233) are connected by the bolts 235 after the first pipe 231 is moved (slid) in the direction of the vehicle's width and the female connector 233 is inserted into the space 133a, as shown in FIG. 4A and FIG. 4B.

(Other Embodiments)

Although the panel 100 is made of resin in the embodiments described above, the present invention is not restricted to this and the panel 100 may be manufactured by other methods such as aluminum die-casting or press molding.

While the invention has been described by reference to specific embodiments chosen for the purposes of illustration, it should be apparent that numerous modifications could be made thereto, by those skilled in the art, without departing from the basic concept and scope of the invention.

What is claimed is:

1. A front end structure of a vehicle comprising:

a front end panel that extends in the direction of the vehicle's width at the front end of the vehicle, at least a heat exchanger mounted on the front side of the vehicle in front of the front end panel, and at least an external pipe that connects the at least a heat exchanger and devices mounted on the vehicle behind the front end panel; wherein the external pipe penetrate through the front end panel;

the external pipe includes a first pipe, one end of which is connected to the heat exchanger and the other end of which a is connector to a first connection, and a second pipe, one end of which is connected to a second connector which is connected to the first connector and the other end of which is connected to the devices;

a through-hole, through which one of the first and second connectors can be inserted, is provided in the front end panel; and one of the connectors is disposed in the through-hole when the first and second connectors are connected;

a size of the connector disposed in the through-hole and a size of the through-hole are substantially the same; and the front end panel is provided with means for engaging at least one of the first and second connectors.

2. A front end structure of a vehicle, comprising:

a front end panel that extends in the direction of the vehicle's width at the front end of the vehicle, at least a heat exchanger mounted on the front side of the vehicle in front of the front end panel, and at least an external pipe that connects the at least a heat exchanger and devices mounted on the vehicle behind the front end panel;

wherein each of the at least an external pipe is arranged in such a way as to penetrate through the front end panel;

wherein each of the at least an external pipe is composed of a first pipe, one end of which is connected to the heat exchanger and to the other end of which a first connector for connection is connected, and a second pipe, to one end of which a second connector connected to the first connector is connected and the other end of which is connected to the devices;

wherein at least one through-hole, through which at least one of the connectors can be inserted, is provided in the front end panel; and wherein at least one of the connectors is located in the at least one through-hole in a state in which both the connectors are connected, the front end panel is provided with a cover that covers the through-hole when viewed in the longitudinal direction of the vehicle, and the cover is separated from the opening surface of the through-hole by a specified distance.

3. A front end structure of a vehicle comprising:

a front end panel that extends in the direction of the vehicle's width at the front end of the vehicle, a heat exchanger mounted on the front side of the vehicle in front of the front end panel, and an external pipe that connects the heat exchanger to a device mounted on the vehicle behind the front end pane; wherein the external pipe penetrates through the front end panel;

the external pipe includes a first pipe, one end of which is connected to the heat exchanger and the other end of which is connected to a first connector, and a second pipe, one end of which is connected to a second connector which is connected to the first connector and the other end of which is connected to the device;

a through-hole, through which one of the first and second connectors can be inserted, is provided in the front end panel;

one of the connectors is disposed in the through-hole when the first and second connectors are connected;

the front end panel is provided with a cover that covers the through-hole when viewed in the longitudinal direction of the vehicle, and the cover is separated from the opening surface of the through-hole by a specified distance; and a space is formed between the cover and an opening of the through-hole in the longitudinal direction of the vehicle, one of the first and second connectors is disposed in the through hole, and the other connector is disposed in the space between the cover and the opening of the through-hole.

* * * * *

UNITED STATES PATENT AND TRADEMARK OFFICE
CERTIFICATE OF CORRECTION

PATENT NO. : 6,953,080 B2
DATED : October 11, 2005
INVENTOR(S) : Norihisa Sasano et al.

It is certified that error appears in the above-identified patent and that said Letters Patent is hereby corrected as shown below:

<u>Column 6,</u>
Lines 4 and 6, delete "at least".
Line 13, "connection" should be -- connector --.
Line 16, "devices" should be -- device --.
Line 64, "pane" should be -- panel --.

Signed and Sealed this

Second Day of May, 2006

JON W. DUDAS
*Director of the United States Patent and Trademark Office*